United States Patent
Brunelli et al.

(10) Patent No.: US 6,218,490 B1
(45) Date of Patent: Apr. 17, 2001

(54) ACRYLIC COPOLYMERS AS ADDITIVES FOR INHIBITING PARAFFIN DEPOSITION IN CRUDE OILS, AND COMPOSITIONS CONTAINING SAME

(75) Inventors: Jean-Francois Brunelli, Bouray/Juine; Stephane Fouquay, Mont Saint-Aignan, both of (FR)

(73) Assignee: CECA S.A., Puteaux (FR)

( * ) Notice: Subject to any disclaimer, the term of this patent is extended or adjusted under 35 U.S.C. 154(b) by 0 days.

(21) Appl. No.: 09/155,111
(22) PCT Filed: Mar. 14, 1997
(86) PCT No.: PCT/FR97/00464
    § 371 Date: Jan. 11, 1999
    § 102(e) Date: Jan. 11, 1999
(87) PCT Pub. No.: WO97/34940
    PCT Pub. Date: Sep. 25, 1997

(30) Foreign Application Priority Data

Mar. 21, 1996 (FR) .................................................. 96 03534
Mar. 21, 1996 (FR) .................................................. 96 03535

(51) Int. Cl.[7] ........................................................ C08F 26/06
(52) U.S. Cl. .......................... 526/258; 526/263; 526/265; 526/318; 526/318.44
(58) Field of Search ................................... 526/258, 263, 526/265, 318, 318.44

(56) References Cited

U.S. PATENT DOCUMENTS 2,839,512 * 6/1958 Barnum et al. ..................... 260/86.1
3,957,659 * 5/1976 van de Kraats et al. ............. 252/8.3
4,426,329   1/1984 Woods et al. .

FOREIGN PATENT DOCUMENTS 1575984  7/1969 (FR) .
2128589 10/1972 (FR) .

OTHER PUBLICATIONS

International Search Report dated Jul. 18, 1997.

* cited by examiner

*Primary Examiner*—Edward J. Cain
(74) *Attorney, Agent, or Firm*—Smith, Gambrell & Russell, LLP

(57) ABSTRACT

Acrylic copolymers for use as additives for inhibiting paraffin deposition in crude oils, and compositions containing the oils and said additives, are disclosed. Specifically, polymeric additives useful for inhibiting paraffin deposition in and improving the flow properties of crude oils, and compositions containing the crude petroleum oils and said additives, are disclosed. Said additives are essentially alcohol acrylate copolymers comprising 10–50 carbons with special chain distributions, as well as the corresponding 2- and/or 4-vinylpyridine terpolymers.

14 Claims, 5 Drawing Sheets

Figure 1:
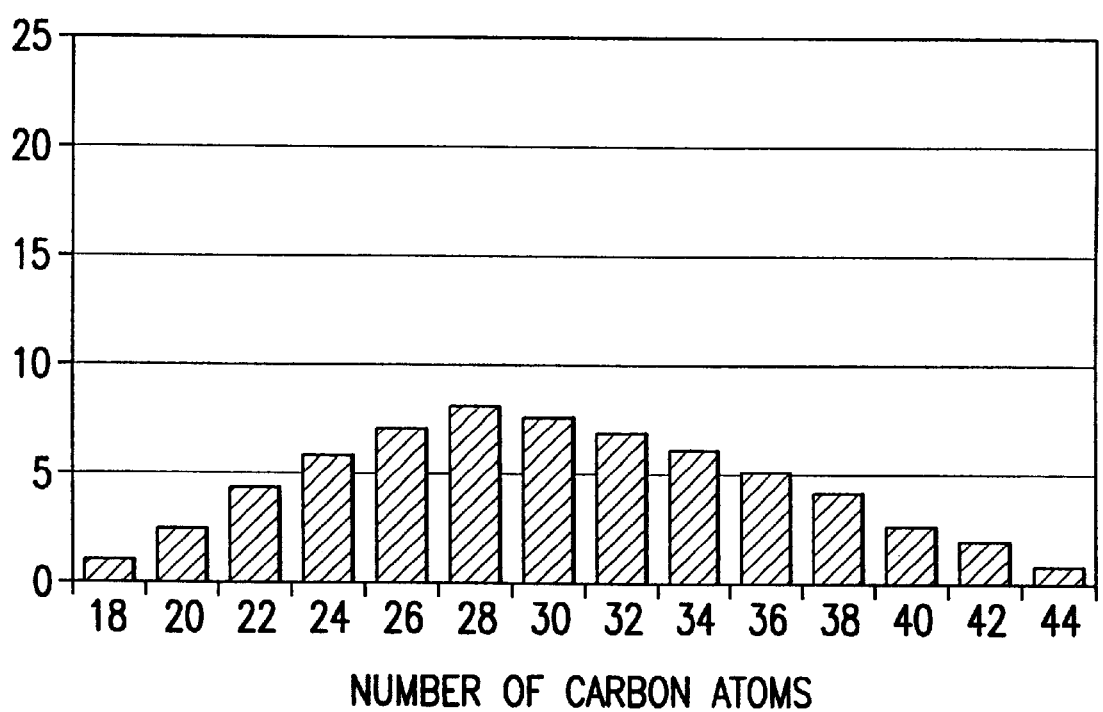

ACRYLIC COPOLYMERS AS ADDITIVES FOR INHIBITING PARAFFIN DEPOSITION IN CRUDE OILS, AND COMPOSITIONS CONTAINING SAME

FIELD OF THE INVENTION

The area of the invention described here is that of crude petroleum oils and additives to improve the production conditions.

Crude oils may contain large fractions of paraffins, the exact quantity and nature of which are variable, depending on the producing field. At the temperature of the wells, the paraffins are liquid and dissolve in the crude oil. As the oil rises to the surface, its temperature becomes lower and the paraffins in it crystallize, forming a three-dimensional network of needles and flakes. This results in loss of fluidity which makes production, transportation, storage and even the treatment of these oils very difficult. Plugging of the pipelines and treatment apparatuses occurs frequently.

BACKGROUND OF THE INVENTION

Numerous methods have been proposed to solve this problem, such as mechanical scraping or heating of the walls. These methods are costly and cannot always be applied.

In order to improve the rheology of crude petroleum oils, SHELL did the pioneering work with FR 1,575,984: it teaches that macromolecular compounds of the "comb" type, constructed on the model of a principal hydrocarbon chain on which fairly long lateral hydrocarbon chains are grafted, that is, chains with at least 14 carbon atoms and at most 30 carbon atoms, can perturb the crystallization of heavy paraffins. This property is manifested well by macromolecules, which have an average molecular weight (number-average molecular weight $M_n$, the definition of which is recalled here:

$$M_n = \Sigma_i N_i M_i / \Sigma_i N_i,$$

where Mi are the molecular weights of the individual species Ni present in the polymer) is between 1000 and 1,000,000 and preferably between 4000 and 100,000. Thus, the utilization of additives was suggested, most frequently polymeric additives, the role of which is to retard or to modify the crystallization of paraffins and thus improve the flow properties of the oil and prevent agglomeration of the crystals formed on the walls.

Numerous studies then attempted to improve the efficacy of these first additives of polymeric nature, either by the synthesis or by the formulation, in order to adapt them to different types of crude oils encountered and to ameliorate successively the difficulties of synthesis and/or handling of the various generations of products, for example, among the most effective ones, $C_{18-30}$ acrylate copolymers, preferably mainly $C_{20-22}$ ones, with a heterocyclic monomer, notably vinylpyridine [U.S. Pat. Nos. 2,839,512 (1958) and FR 2,128,589 (1972) of SHELL]. The presence of polar units confers a dispersing character to the polymer, which permits avoidance of deposition of paraffins on the wall. Now, because of the higher reactivity of long-chain acrylates in comparison to the polar comonomers, incorporation of the latter is generally very difficult and the dispersing effect related to the rate of incorporation of the polar comonomer frequently remains very low.

In spite of these successive improvements, these additives cannot be applied universally to all crude oils, each one representing a particular case and presenting its own problems.

DESCRIPTION OF THE INVENTION

It was now found very unexpectedly that the performance of the paraffin inhibitors of the alkyl acrylate copolymer type or alkyl acrylate/vinylpyridine type can be improved considerably when a part of the monomer alkyl acrylate units participating in the polymer chains, represented by

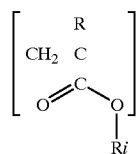

in which R is H or $CH_3$,
in which Ri remainder are linear saturated Ri-OH alcohol groups, the number of carbon atoms of which range from approximately 10 to approximately 50, and come from an acrylic cut having a special distribution of the alkyl chains, called distribution "U" for the purposes of the present patent. Distribution "U" is defined as the distribution of alkyl chains as a function of the length of the chains, here always with even number of carbon atoms, the envelope of which is very regular, the weight-average molecular weight $M_w$ being between 375 and 700, and the number-average molecular weight Mn being between 375 and 840, as well as their poly-dispersity factor $M_w/M_n$ between 1.0 and 1.2 ($M_w$ is the weight-average molecular weight, the formula for calculating it being recalled here:

$$M_w = \Sigma_i N_i M_i^2 / \Sigma_i N_i M_i,$$

where Mi are the molecular weights of individual species Ni present in the polymer). FIG. 1 gives a representation of the distribution of the alcohols distributed according to a "U"-type distribution law with a mean molecular weight of 425 (in order to obtain such alcohols, see U.S. Pat. No. 4,426,329). The polymeric acrylates obtained by a single polymerization of monomers with a "U" distribution cannot be distinguished particularly from those that one obtains from arbitrary monomers, including here products usually available to the expert in the field and in which no particular distribution of the length of the attached chains is expected, in other words, the distribution of which is any distribution, but, in any case, it is not a "U" distribution. What is very astonishing and from which the Applicant derives all the advantageous consequences, is that a powerful synergism develops with regard to the inhibition of crystallization of paraffins in petroleum oils when the products of the "U" class and "non-U" class are distributed within the same polyacrylate or polyacrylate/vinylpyridine copolymer. As with all synergism in mixtures which can be highly variable in composition, the rules are very delicate to discern, but the guiding principles can be formulated, which will be most useful to the person in the field: The "U" components are centered on average lengths of the hanging chains $i_u$ in the copolymer which are longer than that of the $i_{nu}$ of the "non-U" component, and the weight of the total number of units with "U" chains in the copolymer is relatively low in comparison to the total number of "non-U" units. According to the invention, the term vinylpyridine includes 2-vinylpyridine, 4-vinylpyridine or the mixture of the two. The copolymers of the invention contain 1 to 10% of these.

In terms of structural description, one can say that alkyl acrylate copolymers or alkyl acrylate/vinylpyridine copolymers with a weight-average molecular weight between 5000 and 500,000, preferably between 40,000 and 350,000 form part of the invention, and that in these, with acrylate monomer units which participate in the polymer chain

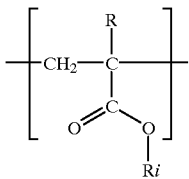

in which R is H or $CH_3$, in which Ri are remainder saturated linear Ri-OH aliphatic alcohols where i represents the number of carbon atoms of these groups, extending between 10 and 50 carbon atoms, and following a distribution law which is the superposition of a "U" distribution law in which the i values are even numbers within the upper range of the interval of 24–50, the center value of which is $i_u$, and a "non-U" distribution law in which the i values are odd or even, lying in the lower range of 10–22 of the interval and the centered value of which, $i_{nu}$, is such that $i_{nu} < i_u$, the weight ratio of all the units

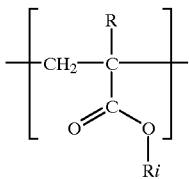

with Ri distributed according to the "U" law to the total number of units distributed according to the "non-U" law, ranges from 1:99 to 50:50, and preferably from 5:95 to 50:50.

The paraffin inhibitor formulations incorporating these copolymers as essential components eliminate the disadvantages cited above and permit the realization of a series of additives with a broad spectrum of utilization, having good solubility in crude oils, which have an effect both on the crystallization of paraffins as well as on the dispersion of crystals already formed. They retard the crystallization of paraffins, the distribution of which generally lies between C60 and C70, permitting lowering of the flow point and the viscosity of these oils and facilitating their transportation, storage and treatment. They are incorporated easily in crude oils of greatly diverse origins.

METHOD OF CARRYING OUT THE INVENTION

The copolymers according to the invention can be obtained according to a simple and not very restricted polymerization process. Thus, the invention offers to the expert in the field the possibility of selecting the cut of polymeric alcohols which will have the best similarity to the crude oil to be treated and which will correspond to the best efficacy, using simple routine tests. Results in this direction are presented in the examples.

The best results are obtained with statistical "U" and "non-U" alcohol acrylates, statistical copolymers or "U" and "non-U" alcohol acrylates and vinylpyridines which contain 5 to 50% of "U" monomers centered at $C_{24}$ to $C_{50}$, the characteristics and the efficacy of the copolymers being defined by the choice of the solvent/initiator pair. The preferred "U" comonomers are alcohol acrylates centered between $C_{30}$ and $C_{40}$.

The polymeric additive according to the invention is obtained either by polymerization of acrylate monomers in toluene, xylene, and, generally speaking, in any aliphatic or aromatic solvent with a boiling point below 300° C., which is chemically inert toward the monomers, in which both the monomers as well as the copolymer are soluble, or in the case of copolymers containing only acrylates, by mixing acrylate homopolymers obtained separately in the same solvent. The polymerization temperature may vary fairly widely as a function of the radical initiator used, for example, between 50° and 150° C. and preferably between 70° and 120° C. The pressure may vary between atmospheric pressure and pressures lower than or equal to 30 bars.

The presence of 1 to 10% of 2-vinylpyridine and/or 4-vinylpyridine units in the copolymer chains according to the invention improves the efficacy significantly, at least toward certain types of oils. An example of this is reported later.

The catalysts are generally chosen from compounds that generate free radicals that are soluble in the reaction medium, for example, peroxides, such as benzoyl, acetyl, ditertiary-butyl peroxide, tertiarybutyl perbenzoate, tertiarybutyl peroctoate or azo compounds, such as azobisisobutyronitrile. Generally, $10^{-5}$ to $10^{-1}$ mole of catalyst and preferably $5 \cdot 10^{-4}$ to $10^{-2}$ mole per mole of monomer is used.

The global concentration of monomer in the solvent may range from 10 to 90% by weight, the preferred concentrations ranging from 20 to 70% in order to control the molecular weight and the pumpability of solutions containing the polymeric additives. The degree of polymerization is measured by gel-permeation chromatography (GPC) which permits one to obtain the weight-average and number-average molecular weights in equivalents of polystyrene, as well as the polydispersity index Pd of the polymer.

The weight-average molecular weight $M_w$ and number-average molecular weight $M_n$ of the vinyl copolymer used alone or in combination with a second copolymer according to the invention may vary within wide limits depending on the nature of the crude to be treated, that is, between 5000 and 500,000 for the $M_w$, preferably 40,000 to 350,000, and the polydispersity Pd can vary between 1.5 and 7.5.

INDUSTRIAL APPLICATION

The copolymers according to the invention are used in the crude oils at doses that can vary within wide limits, depending on the nature, structure and the molecular weight of the copolymer to be used, on the nature of the quantity of the paraffin waxes present in the crude oil and on the desired performance in lowering the flow point; they may vary from 5 to 5000 ppm by weight, preferably from 10 to 2000 ppm. They have a favorable influence on the rheology of the crude oils, in particular, on their viscosity characteristics as a function of the temperature and of the shearing rate which controls in particular the pressure necessary at restarting of an installation (pipeline, wells) that was stopped before, by varying their flow point or temperature of solidification, their initial crystallization point, their flow by simple gravity, and the deposits that are formed at the contact with cold walls. All these characteristics are highly important for the production, transportation and storage of oils and some of these will be illustrated in laboratory tests aimed at evaluating the efficacy of these additives.

The antiparaffin compositions according to the invention are constituted of solutions of these copolymers or additives at concentrations ranging from 2 to 90% by weight, preferably from 20 to 70% by weight in solvents which are soluble in the crude petroleum oils to be treated and which may be advantageously the solvents used during the polymerization.

EXAMPLES

The method of obtaining the various homopolymer, copolymer or terpolymer compositions are described below, serving as examples or counterexamples; the characteristics of the copolymers obtained which are summarized later in Table I are also described.

In these examples, the monomeric "non-U" acrylates 18–22 are acrylates of alcohols with approximately 18–22 carbon atoms (marketed by Elf-Atochem S.A. under the name of Norsocryl® 18–22), the composition of which, expressed in weight %, is the following:

$0 < C_{12}-C_{16} < 10\%$ $0 < C_{16}-C_{18} < 40\%$ $50 < C_{20}-C_{22} < 100\%$ $0 < C_{24}-C_{30} < 10\%$

"U"425 is a cut of monomeric alcohol acrylates obeying the law of "U" distribution, centered at 28–30 carbon atoms, with an average molecular weight of 425. "U"550 thus designates a cut of alcohol monomer acrylate, obeying the "U" distribution law, centered at $C_{40}$, where the mean molecular weight is 550. The term m.18 designates a reputedly pure stearyl methacrylate.

The alcohol acrylates are obtained by methods well-known to the expert in the field, by direct esterification or transesterification catalyzed by zirconium acetylacetonate.

In Table I, the columns $M_n$, $M_w$ and Pd stand, respectively, for the number-average molecular weight, weight-average molecular weight and the dispersion coefficient, which is the ratio of $M_w$ to $M_n$.

EXAMPLE I

"Non-U" Acrylate Homopolymer $C_{18}-C_{22}$ ($M_w \sim 56,000$)

Into a 1 m³ reactor, 438 kg of n-alkyl acrylate with a mean chain length of $C_{18}$ to $C_{22}$ in 359 kg of SOLVANTAR 340® (which is a reaction medium with approximately 55% dry extract), is introduced. The temperature of the reactor is brought gradually to 40° C. under vacuum with bubbling of nitrogen and it was maintained there for 30 minutes and then at 100° C. keeping the nitrogen bubbling on. Then, over a period of 1 hour 30 minutes, 3 kg of tert-butyl perbenzoate (LUPEROX.P® or TRIGONOX.C®) is added continuously between 100° and 105° C., while following the viscosity of the reaction medium. This was found to be stable 2 to 3 hours after the introduction of the initiator. The total polymerization time is 6 hours for a polymerization yield greater than 98%. The product is then brought to 37% active material by the addition of SOLVANTAR 340®.

EXAMPLE Ia

Homopolymer of $C_{18}-C_{22}$ Acrylate ($M_w \sim 119,000$)

The same operating conditions are used as described in composition I, by replacing the SOLVANTAR 340® by xylene.

EXAMPLE II

Homopolymer of $C_{18}-C_{22}$ Acrylate ($M_w \sim 104,000$)

Into a 1 m³ reactor, 438 kg of n-alkylke [sic] acrylate with a mean chain length from $C_{18}$ to $C_{22}$ in 359 kg of SOLVANTAR 340® is introduced. The temperature of the reactor is brought gradually to 40° C. under vacuum while bubbling nitrogen and was maintained there for 30 minutes, and then at 80° C., while bubbling nitrogen. Over a period of 1 hour and 30 minutes, 8 kg of dibenzoyl peroxide (LUCIDOL CH 50®) is added continuously between 80° and 85° C. while following the viscosity of the medium. The viscosity becomes stable 1 hour after the end of introduction of the initiator. The total polymerization time is 4 hours for a polymerization yield greater than 98%. The product is then brought to 37% raw material by the addition of SOLVANTAR 340®.

EXAMPLE III

Homopolymer of $C_{18}-C_{22}$ Acrylate ($M_w \sim 128,000$)

Into a 1 m³ reactor, 558 kg of n-alkylke [sic] acrylate with a mean chain length of $C_{18}-C_{22}$ in 239 kg of SOLVANTAR 340® is introduced (reaction medium at 70% dry extract). The temperature of the reactor is brought gradually to 40° C. under vacuum while bubbling nitrogen and was maintained there for 30 minutes, and then at 100° C. while maintaining the bubbling of nitrogen. Then, over a period of 1 hour 30 minutes, 3 kg of tert-butyl perbenzoate (LUPEROX.P® or TRIGONOX.C®) is added continuously between 100° and 105° C., following the viscosity of the medium, which becomes stable 2 to 3 hours after the end of introduction of the initiator. The total polymerization time is 6 hours for a polymerization yield greater than 97%. The product is then brought to 37% active material by the addition of the solvent SOLVANTAR 340®.

EXAMPLE IV

Homopolymer of $C_{18}-C_{22}$ Acrylate ($M_w \sim 268,000$)

Into a 1 m³ reactor, 518 kg of n-alkylke [sic] acrylate with a mean chain length between $C_{18}$ to $C_{22}$ in 222 kg of xylene is introduced (reaction medium with 70% dry extract). The temperature of the reaction is brought to 40° C. under vacuum while bubbling nitrogen through it and was maintained at this temperature for 30 minutes, then at 100° C., continuing the bubbling of nitrogen. Then, over a period of 1 hour and 30 minutes, 3 kg of tert-butyl perbenzoate (LUPEROX.P® or TRIGONOX.C®) is added continuously between 100° and 105° C., while following the viscosity of the reaction medium. This becomes stable 2 to 3 hours after the end of introduction of the initiator. The total polymerization time is 6 hours for a polymerization yield greater than 97%. The product is then brought to 37% active material by the addition of xylene.

EXAMPLE V

Copolymer of $C_{18}-C_{22}$ Acrylate and of Acrylate of the "U"-type Centered at $C_{28-30}$—In the Table "U"425 (Ratio 90/10—$M_w \sim 123,000$)

The reaction was carried out in xylene (dry extract—65%).

EXAMPLE VI

Copolymer of $C_{18}-C_{22}$ Acrylate and "U"425 Acrylate (Ratio 80/20—$M_w \sim 134,000$)

The reaction was carried out in xylene (dry extract—65%).

EXAMPLE VIa
Copolymer of $C_{18}$–$C_{22}$ Acrylate and "U"425 Acrylate (Ratio 80/20—$M_w$~64,000)

The reaction was carried out in xylene (dry extract—55%).

EXAMPLE VII
Copolymer of $C_{18}$–$C_{22}$ "non-U" Acrylate and "U"425 Acrylate (Ratio 70/30—$M_w$~146,000)

Into a 1 m³ reactor, 363 kg of n-alkyl acrylate with a mean chain length of $C_{18}$ to $C_{22}$ and 155 kg of "U"425 acrylate (ratio 70/30) in 279 kg of xylene (dry extract—65%) was introduced. The temperature of the reactor was gradually brought to 40° C. under vacuum while bubbling nitrogen, maintaining it at this temperature for 30 minutes, then it was brought to 100° C. with the bubbling of nitrogen continued. Then, over a period of 1 hour 30 minutes, 3 kg of tert-butyl perbenzoate (LUPEROX.P® or TRIGONOX.C®) was added between 100° and 105° C. while following the viscosity of the medium. This was found to become stable 2 to 3 hours after the end of the introduction of the initiator. The total polymerization time was 6 hours for a polymerization yield greater than 97%. The product was then brought to 37% active material by the addition of xylene.

EXAMPLE VIII
Copolymer of $C_{18}$–$C_{22}$ Acrylate and "U"425 Acrylate (Ratio 50/50—$M_w$ Cannot Be Measured)

EXAMPLE IX
Homopolymer of "U"425 Acrylate ($M_w$ Cannot Be Measured)

The same operating conditions as those described for composition III are used. The total polymerization time is 6 hours for a polymerization yield greater than 95%. The product is then brought to 37% active material by the addition of xylene.

EXAMPLE X
Copolymer of $C_{18}$–$C_{22}$ Acrylate and of a "U"550 Acrylate with the Alcohol "U" centered at $C_{40}$ (Ratio 90/10—$M_w$~162,000)

The reaction was carried out in xylene (dry extract 65%).

EXAMPLE XI
Copolymer of $C_{18}$–$C_{22}$ Acrylate and "U"550 Acrylate (Ratio 95/5—$M_w$~150,000)

The reaction was carried out in xylene (dry extract 65%).

EXAMPLE XII
Copolymer of Stearyl Methacrylate and "U"425 Acrylate (Ratio 70/30—$M_w$~317,000)

EXAMPLE XIII
Terpolymer of Stearyl Methacrylate, $C_{18}$–$C_{22}$ Acrylate and "U"425 Acrylate (Ratios 14/56/30—$M_w$~180,000)

EXAMPLE XIV
Terpolymer of Stearyl Methacrylate, $C_{18}$–$C_{22}$ Acrylate and "U"425 Acrylate (Ratios 28/42/30—$M_w$~214,000)

EXAMPLE XV
Terpolymer of 4-vinylpyridine, $C_{18}$–$C_{22}$ Acrylate, and "U"425 Acrylate (Ratios 5/66.5/28. 5—$M_w$~221,000)

EXAMPLE XVI
(Counter-example) Copolymer of 4-Vinylpyridine and $C_{18}$–$C_{22}$ Acrylate (Ratios 5/95—Solubility Failure, $M_w$ Not Measurable)

EXAMPLE XVII
(Counter-example) Copolymer of 4-Vinylpyridine and "U"425 Acrylate (Ratios 5/95—Solubility Failure, $M_w$ Not Measurable)

EXAMPLES XVIII TO XXII
In these examples, various compositions with 37% additive were incorporated into crude oils—that is, at 20° C. above the flow point of the crude under agitation—at concentrations ranging from 100 to 1500 ppm. The performances obtained for the polymers according to the invention were compared with that of the control with Shell Swimm 5X® and Shell Swimm 11T®, two well-known paraffin inhibitors marketed by the SHELL OIL COMPANY.

TABLE I

| homopolymer | $M_n$ | $M_w$ | Pd | composition "non-U" 18–22 |
|---|---|---|---|---|
| I | 22,700 | 56,000 | 2.5 | 100 |
| Ia | 41,600 | 119,000 | 2.9 | 100 |
| II | 41,400 | 104,000 | 2.5 | 100 |
| III | 32,500 | 128,000 | 4.0 | 100 |
| IV | 39,100 | 268,000 | 6.9 | 100 |
| copolymer | | | | "non-U" 18–22/"U"425 |
| V | 38,700 | 123,00 | 3.2 | 90/10 |
| VI | 39,200 | 134,00 | 3.4 | 80/20 |
| VIa | 28,100 | 64,300 | 2.3 | 80/20 |
| VII | 36,500 | 146,000 | 4.0 | 70/30 |
| VIII | not measurable | not measurable | not measurable | 50/50 |
| homopolymer | | | | "U"425 |
| IX | not measurable | not measurable | not measurable | 100 |
| copolymer | | | | "non-U" 18–22/"U"550 |
| X | 34,000 | 162,000 | 4.8 | 90/10 |
| XI | 42,000 | 150,000 | 3.6 | 95/5 |
| copolymer | | | | m.18/"U"425 |
| XII | 190,000 | 317,000 | 1.7 | 70/30 |
| terpolymer | | | | m.18/"non-U" 18–22/"U"425 |
| XIII | 67,000 | 180,000 | 2.7 | 14/56/30 |
| XIV | 98,000 | 214,000 | 2.2 | 28/42/30 |
| copolymer VP | | | | 4-VP/"non-U" 18–22/"U"425 |
| XV | 440,000 | 221,000 | 5.0 | 5/66.5/28.5 |
| XVI | not measurable | not measurable | not measurable | 95/0/5 |
| XVII | not measurable | not measurable | not measurable | 0/95/5 |

In order to determine the efficacy of these polymers as inhibitors of the deposition of paraffins, there are several approaches, which include the rheological behavior of the crude and lowering of their flow point.

By modifying the phenomena of crystallization of crude oils, the paraffin inhibitors influence their rheological characteristics directly. It is clear that, during the industrial utilization of these products during production/transport, the rheological measurements will give a direct account of their performance.

In particular, the viscosity is measured as a function of the shear rate.

Crude oils generally have a rheological behavior of the Binghamian plastic fluid type, that is, the shearing stress varies linearly with the shearing rate. In contrast to Newtonian fluids, it is necessary to apply a minimum force in order to put the fluid into movement. This force corresponds to the minimum shear stress (yield value or yield point). This measure is currently practiced on production sites because it permits evaluation with a simple calculation of the pressure which is necessary to start up again an installation (pipe, wells) that was stopped before. It is this start-up pressure that the paraffin inhibitor additives are capable of reducing considerably, by disorganizing the crystalline network being formed.

In order to measure this yield value, a FANN type viscosimeter is used and the stress is measured as a function of the speed gradient applied to the mobile part. The curve obtained is an asymptotic curve, and it is sufficient to extrapolate the right asymptote to zero shear stress to obtain the value of the flow threshold:

$$\Delta P = 4L\tau/D$$

The flow point or flow temperature of the crudes is also a very important characteristic in evaluating the rheological properties of a crude oil. This characteristic is measured under very precise conditions, dictated by the standard ASTM D97B. It is generally assumed that a compound belongs to the class of flow-point depressors if it is capable of causing a decrease of the flow point by at least 6° C. for a rate of utilization not exceeding 0.2% by weight of the polymeric additive.

The following nonlimiting examples show the advantages brought about by the invention for different crudes.

EXAMPLE XVIII

Modification of the Flow Point of a Crude from Gabon

The oil tested is a crude oil with a density of 852 kg/m³ (15° C.) and with a paraffin content (determined by gas chromatography) of 15%. Its flow point, measured under the conditions of the standard ASTM D 97 B, is 18° C.

In Table II, which follows, the flow points obtained for two compositions with 37% additive described in Examples I to XVII above and the differences in flow points observed in comparison to the untreated crude are reported.

It is noted that the optimum efficacy obtained with copolymer VII (70/30) is considerably improved with the terpolymer XV, which could be considered overall as a copolymer of 4-vinylpyridine and the copolymer VII in the weight ratio of 5/95 (or more precisely, 5/66.5/28.5), to the point that the lowering of the flow point can no longer be measured with the tests adopted commonly (flow point lower than −45° C.).

TABLE II

| composition at 37% | flow point (° C.) | | ΔT (° C.) | |
|---|---|---|---|---|
| example | 100 ppm | 200 ppm | 100 ppm | 200 ppm |
| I | +6 | −3 | −12 | −21 |
| Ia | 0 | −3 | −18 | −24 |
| II | 0 | −6 | −18 | −24 |
| III | 0 | −9 | −18 | −27 |
| IV | −6 | −9 | −24 | −27 |
| Shell Swimm 5X[a] | −6 | −9 | −24 | −27 |
| V | −12 | −15 | −30 | −33 |
| VI | −15 | −18 | −33 | −36 |
| VII | −18 | −21 | −36 | −39 |
| VIII | −3 | −6 | −21 | −24 |
| IX | +6 | +3 | −12 | −15 |
| X | −15 | −15 | −33 | −33 |
| XI | −12 | −12 | −30 | −30 |
| XII | +3 | +3 | −15 | −15 |
| XIII | −15 | −15 | −33 | −33 |
| XIV | −9 | −12 | −27 | −30 |
| Shell Swimm 11T[b] | −6 | −12 | −24 | −30 |
| XV | ≦27 | ≦27 | −45 minimum | −45 minimum |
| III + IX (70/30) | −6 | −15 | −24 | −33 |

[a] Shell Swimm 5X is a composition with 50% by weight of a $C_{18}$–$C_{22}$ "non-U" alcohol acrylate homopolymer sold by Shell.
[b] Shell Swimm 11T is a composition with 50% by weight of a $C_{18}$–$C_{22}$ "non-U" alcohol acrylate copolymer and vinylpyridine sold by Shell.

Figure 2:
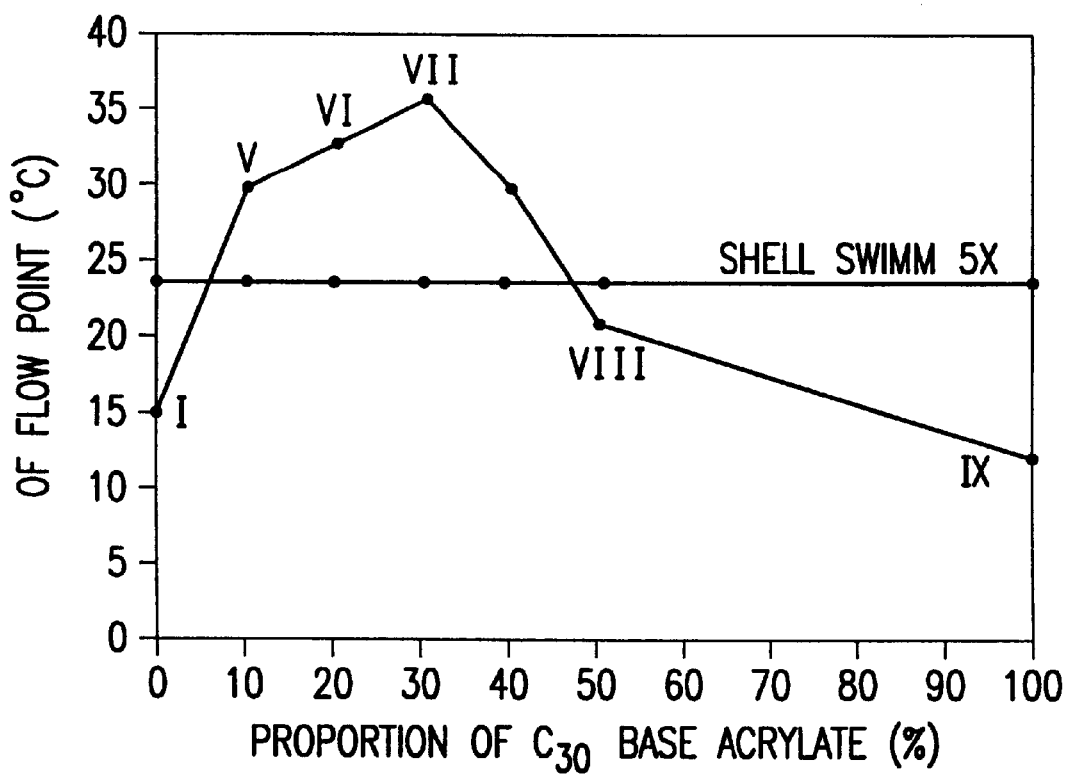

The graph in FIG. 2 shows the lowering of the flow point of this Gabon crude with 100 ppm of a composition with 37% "non-U" 18–22 acrylate copolymer/"U" alcohol acrylate centered at $C_{30}$, as a function of the percentage of acrylate $C_{30}$ in the copolymer. This graph shows clearly the interest of copolymers carrying 5 to 50% "U" alcohol acrylate centered at $C_{30}$ on this type of crude oil, and more particularly, that of the copolymer of Example VII with 30% "U" alcohol acrylate centered at $C_{30}$ as well as the 50% threshold, below which one observes a significant lowering of the efficacy in combination with the lower solubility of the copolymer. This efficacy cannot be found at such a high level with the 70/30 mixture by weight, corresponding to "non-U" $C_{18-22}$ and "U" $C_{30}$ homopolymers, respectively, for the same reasons.

Figure 3:
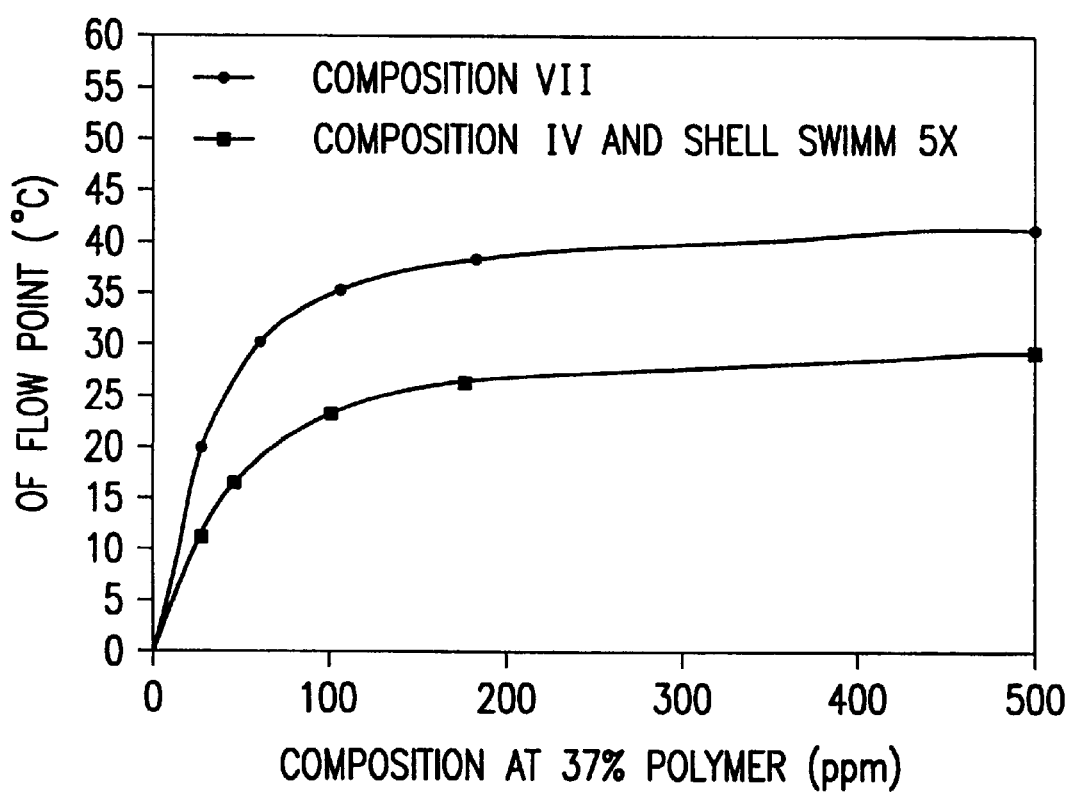

The graph reproduced on FIG. 3 is the curve of the gain of the flow point of this same crude from Gabon as a function of the addition of various quantities of the products of Examples IV and VII (compositions with 37%). It permits evaluation of the improvement obtained with Composition Example VII of the invention with this crude oil, comparing it to one of the actual reference products present on the market, such as Shell Swimm 5X®. A supplementary gain of efficacy is obtained with the aid of the addition of 4-vinylpyridine according to Example XV.

EXAMPLE XIX

Modification of the Flow Point of an Egyptian I Crude

The oil tested is a crude with a density of 845 kg/m³ (15° C.) and a paraffin content of 15%. Its flow point, measured under the conditions of standard ASTM D97B, is +15° C.

Table III shows the flow points obtained with different compositions and 37% additive, for two contents, described in the preceding example as well as the deviations of the flow point in comparison to the untreated crude.

TABLE III

| composition with 37% | flow point (° C.) | | ΔT (° C.) | |
|---|---|---|---|---|
| example | 1000 ppm | 1500 ppm | 1000 ppm | 1500 ppm |
| I | +6 | +3 | −9 | −12 |
| IV | −3 | −6 | −18 | −21 |
| Shell Swimm 5X | −3 | −6 | −18 | −21 |
| VII | −6 | −9 | −21 | −24 |
| III + IX (70/30) | −3 | −6 | −18 | −21 |

The same remarks as, for example XVIII, can be made for this crude oil, which is more difficult to treat, the useful doses thus being between 1000 and 1500 ppm.

EXAMPLE XX

Modification of the Flow Point of an Egyptian II Crude

The oil tested is a crude with a density of 820 kg/m³ (15° C.) and a paraffin content of 20–25%. Its flow point is 27°–30° C.

Table IV shows the flow points obtained with different compositions having 37% additive, for two contents, described in the preceding example as well as the flow temperature deviations in comparison to the untreated crude.

TABLE IV

| composition at 37% | flow point (° C.) | | ΔT (° C.) | |
|---|---|---|---|---|
| example | 1000 ppm | 1500 ppm | 1000 ppm | 1500 ppm |
| I | +21 | +18 | −9 | −12 |
| IV | +15 | +12 | −15 | −18 |
| Shell Swimm 5X | +12 | +12 | −18 | −18 |
| VII | +9 | +6 | −21 | −24 |
| III + IX (70/30) | +18 | +8 | −12 | −21 |

The same remarks as were made for Example XIX on this example of crude oil having a flow point of 30° C., the useful doses are, here too, between 1000 and 1500 ppm.

Figure 4:
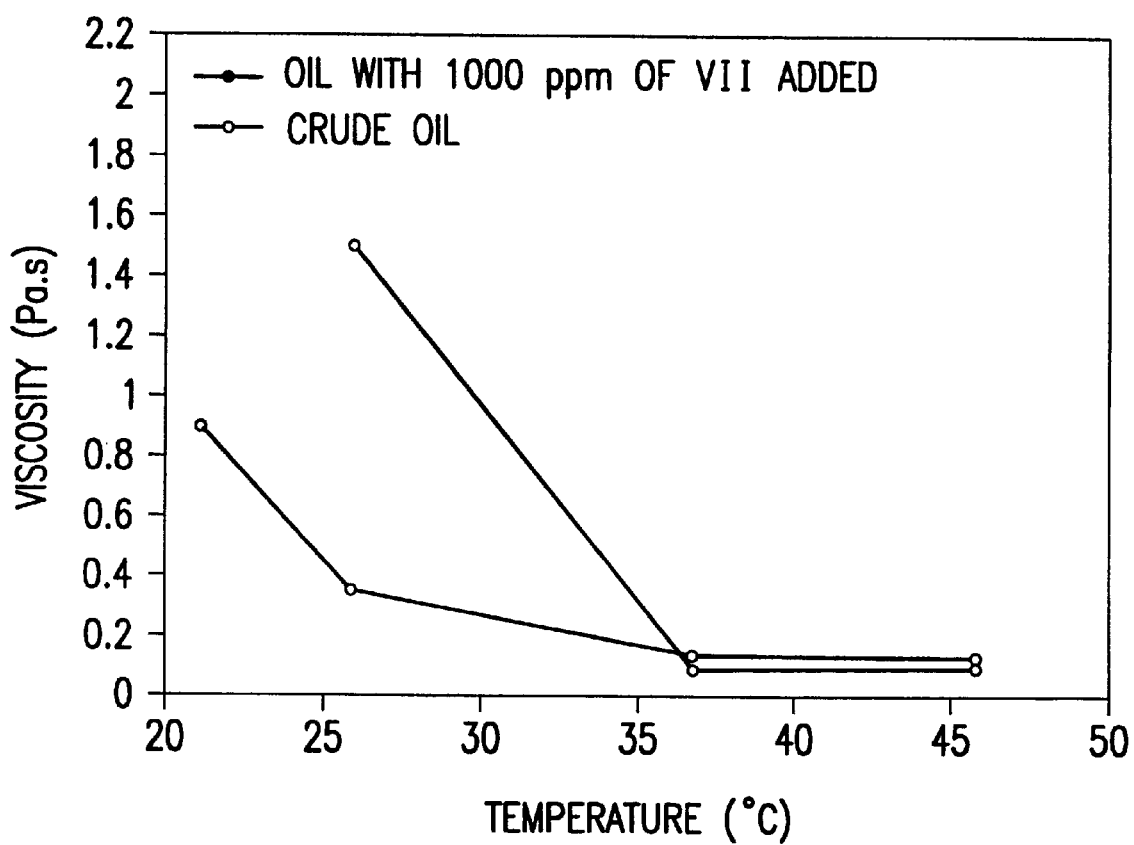
Figure 5:
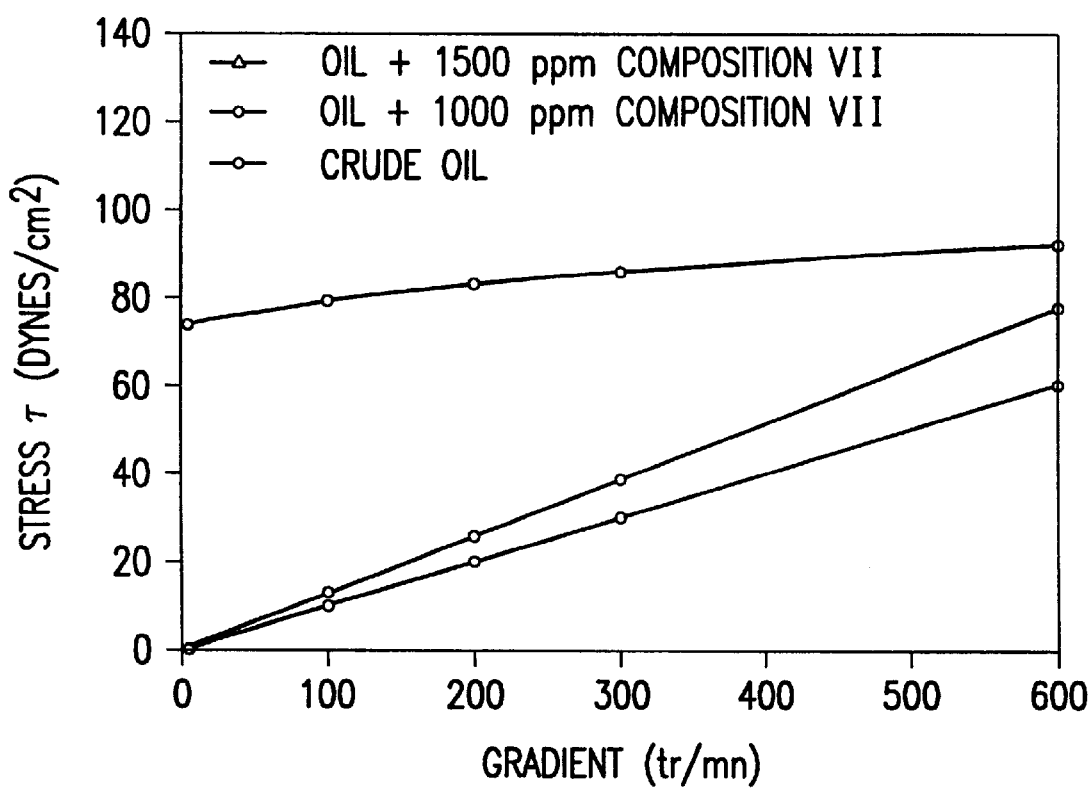

The curves of FIGS. 4 and 5 illustrate on the one hand the improvement of the thermal susceptibility with regard to viscosity of a crude oil by the addition of 1000 ppm of composition VII (with 37% polymer), the benefit of which is a significant lowering of its viscosity at low temperatures and, on the other hand, a beneficial influence on the flow threshold (yield value) at 15° C.

EXAMPLE XXI

Modification of the Flow Point of an Egyptian III Crude

The oil tested is a crude having a density of 843 kg/m³ (15° C.), the paraffin content of which is 10.4%. Its flow point is +9° C.

Table VI shows the flow points obtained with 30 ppm of various compositions with 37% additive as well as the deviations of the flow temperature in comparison to the untreated crude.

TABLE VI

| composition with 37% example | flow point (° C.) 30 ppm | ΔT (° C.) 30 ppm |
|---|---|---|
| IV | 0 | −9 |
| Shell Swimm 5X | −24 | −33 |
| VII | −27 | −36 |
| Shell Swimm 11T | −12 | −21 |
| XV | ≤24 | ≤33 |

Here, too, one notes the remarkable effectiveness of additive VII and that of the terpolymer XV.

EXAMPLE XXII

Modification of the Flow Point of a Syrian Crude

The oil tested is a crude with a density of 870 kg/m³ (15° C.), the paraffin content of which is 6%. Its flow point is 18° C.

Table V reports the flow points obtained with different compositions at 37% additive, described in the preceding example, for two contents as well as the changes of the flow point in comparison to that of the untreated crude.

TABLE V

| composition at 37% | flow point (° C.) | | ΔT (° C.) | |
|---|---|---|---|---|
| example | 100 ppm | 200 ppm | 100 ppm | 200 ppm |
| I | −3 | −9 | −21 | −27 |

TABLE V-continued

| composition at 37% | flow point (° C.) | | ΔT (° C.) | |
|---|---|---|---|---|
| example | 100 ppm | 200 ppm | 100 ppm | 200 ppm |
| IV | −9 | −12 | −27 | −30 |
| Shell Swimm 5X | −6 | −9 | −24 | −27 |
| VII | −15 | −21 | −33 | −39 |
| III + IX (70/30) | −6 | −12 | −24 | −30 |

This novel example had no other goal but to confirm the broad spectrum of activity of the additives according to the invention and their superiority in comparison to the products present on the market.

All these examples demonstrate the remarkable and unexpected efficacy of copolymers of acrylates of primary fatty alcohols with a "U" distribution and of the compositions containing them according to the invention, with regard to the global improvement of the behavior of the crude oils, notably with a large lowering of the flow point and of the threshold of flow of crude oils containing the additives.

What is claimed is:

1. Copolymers of alkyl acrylates or of alkyl/vinylpyridine acrylates with a weight-average molecular weight $M_w$ between 5000 and 500,000, in which the monomeric acrylate units that participate in the polymer chain are the following units

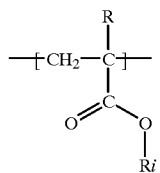

in which R is H or $CH_3$, and in which Ri are saturated linear aliphatic alcohol Ri-OH group residues where i represents the number of carbons of these groups which extend between 10 and 50 carbon atoms and which have the characteristic of following a distribution law which is the superposition of a "U" distribution law in which the i values are even numbers ranging in the upper part of the interval 24–50, the centered value of which is $i_u$, and the "non-U" distribution law in which the I values are even or odd numbers ranging in the low 10–22 part of the interval, and the centered value $i_{nu}$ of which $i_{nu}<i_u$, the weight ratio of all the units

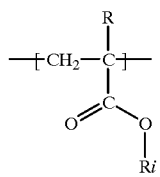

distributed according to the "U" law to all the units distributed according to the "non-U" law ranging from 1:99 to 50:50.

2. Copolymer according to claim 1, wherein the "non-U" units are units of acrylates of alcohols with about 10–22 carbon atoms and the "U" units are units of acrylates of alcohols with about 24–50 carbon atoms.

3. Alkyl acrylate copolymers according to claim 1, wherein the copolymers carry, besides the acrylate units, 1 to 10% vinylpyridine units, counted by weight with respect to that of the copolymer.

4. Method for obtaining copolymers described according to claim 1, wherein the polymerization of a mixture of monomers in which a part of the monomeric acrylic or methacrylic esters

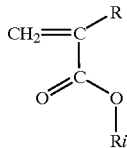

obeys a "U" distribution law and the complementary part of the ester monomers obeys a "non-U" distribution law, the weight ratio of all the esters distributed according to the "U" law and all the esters distributed according to the "non-U" law ranging from about 5:95 to about 50:50.

5. Method according to claim 4, wherein the mixture of acrylic or methacrylic esters is obtained by mixing esters of each of the "U" and "non-U" categories of distribution in a weight ratio of 1:99 to 50:50.

6. Method according to claim 4, in which the mixture of the acrylic or methacrylic esters is obtained by prior mixing of alcohols of each of the "U" and "non-U" distribution categories, followed by their esterification with acrylic or methacrylic acid.

7. Method according to claim 4, wherein the operation is carried out in a solvent in which the monomers as well as the copolymer are soluble and the boiling point of which is less than 300° C.

8. Method according to claim 7, wherein the solvent is xylene.

9. Additive intended to lower the flow point of petroleum crude oils and to improve their rheological behavior, wherein it consists of copolymers described according to claim 1 and of an aromatic and/or aliphatic solvent, the weight ratio of the copolymer in the additive being between 2 and 90%.

10. Composition comprising a petroleum crude oil and a copolymer as described in claim 1, wherein the content of copolymers is between 5 and 5000 ppm.

11. Copolymer according to claim 1, wherein the $M_w$ is between 40,000 and 350,000, the weight ratio is between 5:95 to 50:50.

12. Method according to claim 5, wherein the weight ratio is from 5:95 to 50:50.

13. Additive according to claim 9, wherein the weight ratio of the copolymer in the additive is between 20 and 70%.

14. Composition according to claim 10, wherein the content of copolymers is between 10 and 2000 ppm.

* * * * *